April 25, 1933.                A. S. LEVY                1,905,595
                 INTERCHANGEABLE PORCELAIN ROOT FACING
                         Filed Aug. 28, 1922
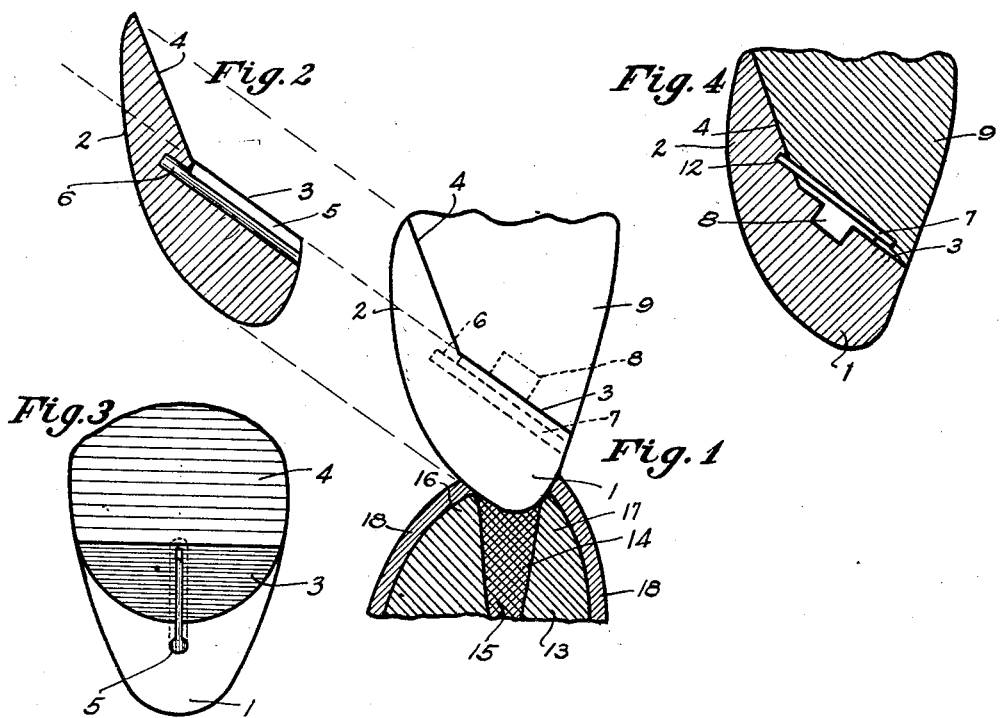
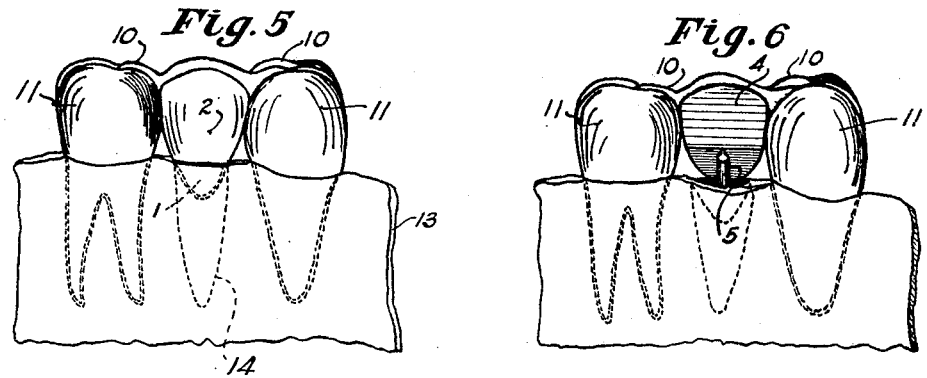
Inventor
A.S.Levy.
By
Attorney Patented Apr. 25, 1933

1,905,595

UNITED STATES PATENT OFFICE

ARTHUR S. LEVY, OF BIRMINGHAM, ALABAMA, ASSIGNOR, BY MESNE ASSIGNMENTS, TO DIXIE DENTAL MANUFACTURING CO., OF PHILADELPHIA, PENNSYLVANIA, A CORPORATION OF PENNSYLVANIA

INTERCHANGEABLE PORCELAIN ROOT FACING

Application filed August 28, 1932. Serial No. 584,729.

My invention relates to an integral porcelain facing and root extension preferably having an interchangeable attachment for connecting it to a cusp to form a novel artificial dummy tooth and to a process for mounting such an artificial tooth with its root extension embedded in the gum or alveolar process.

The most modern dental practice indicates the desirability of utilizing a dummy tooth having a porcelain root which will enter to the proper extent, according to the tooth involved, into the socket in the bony or alveolar process and prevent its absorption. Heretofore such dummy teeth have been made by the dentist who must form the porcelain root of the desired shape and bake it to a porcelain facing. This baking operation is expensive and requires equipment and skill beyond the ordinary, as high pressure is necessary to obtain a perfectly smooth surface which is essential in the case of any part intended to enter the gum and alveolar process. After the combined facing and root have been thus produced, some feasible fastening must be provided for its connection to the cusp, which, in the manner well understood in this art, can then be mounted in the bridge or connected to the adjacent tooth abutments. Obviously, when so mounted in the mouth, the cusp attachment is permanent and any fracture or damage to the facing requires a most expensive operation to dismount the dummy or bridge, repair the injured or broken part and then remount the dummy in the mouth.

One object of my invention is to adapt the integral porcelain facing and root extension to be manufactured and sold to the trade as an integral interchangeable root facing in the requisite standard shapes and colors and equipped with suitable interchangeable fastenings, backings or cusps, thus enabling the local dentist to select an appropriate facing having the desired type of root extension, then grind the occlusal end of the facing to fit the case in hand, and then select a ready made cusp to fit the ground facing, thus forming a dummy without a baking, casting or soldering operating and by this means the desirable practice of using dummies with a root extension can be greatly enlarged.

A further object is to so design the combined facing and root extension, with relation to its interchangeable fastening, that when any part of the porcelain facing is broken or damaged and needs to be replaced, it can be removed and replaced without disturbing the mounting of the cusp. This I accomplish by inclining labio-bucco occlusally the co-acting interchangeable fastening elements of backing and root facing and disposing in substantial parallelism with the line of inclination of such fastening that portion of the surface of the root extension which is in contact with the gum tissue and which must move outwardly over such tissue as the root facing is removed for repair or interchange. In other words the root portion of the facing shall be so designed that notwithstanding it has portions which overlap parts of the gum on the lingual side thereof, nevertheless such portions of the root extension will, in following the line of inclination of the fastening, ride over the gum without injury thereto. When I refer to the gum above I mean to include any portion thereof which it may be desired to have the root extension engage. By such an arrangement notwithstanding that the root extension is embedded in the alveolar process the root extension and facing as a whole can be slipped off the fastening as it is moved outwardly between the approximately parallel surfaces of the cusp base and outer wall of the socket in the gum and bony process.

A further feature of my invention is to so design and arrange the interchangeable attachment that all the necessary grinding of the facing to fit must be done at its occlusal, rather than a its gingival end, as has heretofore been the case, as the latter end must be left with a smooth porcelain surface if a rebaking of the root facing is to be avoided. The following important advantages accrue from this feature, i. e., each size of root facing can be ground to fit a greater variety of cases without weakening the attachment between the root extension and cusp and the number of molds required for the production of the root facings can be reduced to a minimum, and it forms the root extension of smooth glazed porcelain which alone is suitable to enter or even engage the gum, hence my invention has within its contemplation the formation with the facing proper of a root extension formed of a heavy glazed unground body of porcelain which alone contacts with the gum whether to merely engage or to penetrate same, and which is shaped so that the joint between it and the cusp is not in contact with the gum or bony process.

My invention in its preferred embodiment is illustrated in the accompanying drawing which shows several styles of interchangeable fastenings.

Fig. 1 is a side elevation of a dummy shown with its root extension seated in a tooth socket in the bony process.

Fig. 2 is a detail cross-sectional view of the combined facing and root, as shown in Fig. 1, the dotted line indicating the path followed by the facing in removing it from its permanently anchored cusp or backing.

Fig. 3 is an elevation of the facing and root extension shown in Fig. 2.

Fig. 4 is a vertical cross-sectional view of a dummy having a modified type of interchangeable mounting for the root facing.

Figs. 5 and 6 are views corresponding in perspective, showing in Fig. 5 the complete dummy mounted in the mouth, and in Fig. 6 the cusp or backing as same would appear after the removal of the root facing.

Similar reference numerals refer to similar parts throughout the drawing.

As illustrated, the dummy tooth comprises a porcelain with a root extension 1 preferably formed integrally with the facing 2, and the root extension being provided on its upper surface with a cusp or backing seat 3 which slopes upwardly or downwardly according to the position of the facing in the upper or lower jaw towards and joins the back wall 4 of the facing 2. The root seat 3 is disposed so as to be out of contact with the gum or alveolar process and preferably has formed therein an undercut slot 5 which extends from the gingival end of the seat 3 substantially to the base of the back wall 4, the undercut portion of the slot being preferably extended at 6 into the facing 2. Such an undercut slot can be formed in accordance with the general practice in this art and it is adapted to receive an interchangeable fastening pin 7 which has a shank 8 that is embedded in the cusp or backing 9 of the dummy 2. This pin is of well known construction and will fit snugly in the slot 5 with an extension fitting into the extension 6 of the slot, and it will serve to detachably mount the root facing on the cusp or backing. This cusp or backing is fitted to the lingual faces of the root facing having faces 3ª and 4ª which respectively engage the faces 3 and 4 of the root facing and when attached thereto forms a complete dummy, which by means of anchors or abutments 10 can be anchored to the abutment teeth 11, which are typical of any anchorage means for the backing in the natural teeth or in an artificial bridge. If desired the shank 8 of the interchangeable fastening pin 7 may be anchored in the root extension 1 so as to dispose the pin 7 parallel with and spaced slightly above the root extension seat 3. The upper end of the pin 7 is preferably baked in the facing 2. The pin stops short of the rear edge of the seat 3. The cusp or backing 9 is formed of gold about the pin which thus serves as an interchangeable fastening to connect the root facing to the cusp or backing.

In practice, the dentist grinds the occlusal end of the facing 2 to the size required and the cusp is either selected from stock or molded and cemented in place in the manner well understood in the art. By this means a dummy tooth with a root extension can be produced and distributed to the trade as a complete article of manufacture and dummies with porcelain root extensions can be produced at comparatively small cost, thus permitting their wide spread use.

Having mounted the dummy by the attachment of the cusp to the adjacent abutments or bridge, if the facing or root is broken or damaged it will be found, by observing the corresponding inclination of the seat 3 with the inclination of the outer root extension wall engaged in the root socket in the bony process 13, that the combination porcelain root facing as a whole can be detached by being moved upwardly along the path indicated by the dotted lines between Figs. 1 and 2, and thus slipped outwardly off the pin 7, which movement will at the same time cause the root extension to rise out of the socket and thus allow its disengagement without destroying the cusp mounting and permit a new root facing to be remounted on the same cusp. I desire to claim this feature broadly and without reference to any particular style of attachment or method of manufacture of the root facing.

In Fig. 1 I show a cross section of the jaw 13 with the socket 14 left by the extraction of the natural tooth filled with bone building cells 15 except for the portion thereof occupied by the root extension 1 which goes far enough into the socket to hold the inner and outer plates 16 and 17 of the bony process substantially in their original position. It will be seen that the bone cells 15 will fill in all around the root extension 1 and that the gum 18 hugs it as tightly as it would the natural tooth.

The advantages of my invention briefly stated, are:—

1. Absorption of the bony process is lessened to a great extent by holding the outer and inner plates 16 and 17 in position, thus preserving the natural facial expression.

2. The natural outline of the lost tooth is carried out as far as possible, which adds to the comfort of the patient, protects the underlying tissues, preserves the articulation of speech, and eliminates a V-shaped space which in the present practice is left between the backing on the one hand and the gum 18 on the other, such space providing an undesirable pocket for the collection of food particles.

3. Highly glazed porcelain when placed in the mouth remains cleaner than any material known today, hence a bridge composed of a root facing with the porcelain root extension engaging or embedded in the gum is the most sanitary that can be made.

4. Inasmuch as the root facing is to be made in its preferred form as an integral porcelain element, there will be no joint or crack between the facing and the root extension and the whole will present to the gum or bony process only a highly glazed, smooth uninterrupted surface which alone is obtainable where the tooth is baked under heavy pressure, and the joint with the backing or cusp is kept away from the gum.

5. Due to the fact that the root extension goes directly into the tooth socket and that as a result there will be but little absorption of the bony process, it will not be necessary to remove the root facing in accordance with my invention and replace it with a longer one.

Having thus described my invention, what I claim as new and desire to secure by Letters Patent, is:—

1. As an article of manufacture, a porcelain root and facing, the root portion having at its occlusal end a cusp seat inclined labio-bucco, occlusally to correspond with the slope of the diametrically opposite face of the root portion that is to be embedded in the tooth socket, and a pin fastening slot in the root disposed parallel with said seat and face.

2. The divisible tooth which includes a tooth body having its crown portion intersected by a dovetailed mortise which extends through the rear surface of the tooth-body and thence forward to its terminus at a distance from the front surface of the tooth, the front part of said crown portion being a greater distance than its rear part from the gingival end of the tooth; and a cusp plate having a surface to fit on said crown portion; said cusp plate having a tenon which has a cross-section conforming to that of said mortise so as to be slidable into and out of the mortise.

3. A porcelain tooth comprising a labial portion, a root portion and a lingual portion extending downwardly from the root portion but terminating short of the length of the labial portion, the bottom face of said downwardly extending portion and the lingual face of the labial portion constituting planes intersecting in an obtuse angle, a bore in and extending transversely through the downwardly extending portion and opening into the lingual face of the said portion, a slot of less diameter opening said bore to the plane of the underface of said downwardly extending portion, and a backing formed to cover said planes and provided with a tenon complemental to the bore and slot.

4. A tooth which includes a root extension and a crown portion, the crown portion provided with an inclined surface extending labio-occlusally from the lingual side, the front side being a greater distance than the rear side from the gingival end of the tooth; a metal backing having a surface to fit said inclined surface; said crown portion and backing having retaining means disposed in the direction of the inclined surface and engaged by a relative sliding movement of the inclined surfaces of the crown portion and the backing, whereby the root extension can be withdrawn from the root socket by an outward movement in the direction of said inclined surface.

5. A divisible tooth including a tooth body and a cusp plate, the tooth body being formed with an integral root extension, a backing seat formed on said tooth body, said seat being disposed so as to be out of contact with the gum, a bore in the tooth body extending from the lingual face toward the labial face, a slot of less diameter opening said bore for a part of its length to the surface of said seat, the remaining portion of the bore being closed to said seat, and divergent to the part of the surface beyond the end of the slot, said cusp plate having a post connected to it by a plate of less diameter than the post whereby the post and plate are adapted to slide and fit in said bore and slot and thereby connect the cusp plate to the tooth body, the labial end portion of the post extending into the tooth body beyond the labial end of the slot.

6. The divisible tooth which includes a tooth-body having its crown portion intersected by a mortise which extends through the lingual face of the tooth-body and thence forward to its terminus at a distance from the labial face of the tooth, the labial face of said tooth extending a greater distance than its lingual face from the gingival end of the tooth; and a cusp plate having a surface to fit on said crown portion, said cusp plate having a tenon conforming to that of said mortise so as to be slidable into and out of the mortise.

7. An artificial tooth comprising a facing, a root and a lingual overhang portion, a post hole extending from the lingual side into the overhang portion and a slot in the under face of the overhang portion communicating gingivally throughout its length with said post hole.

8. In permanent dental bridgework, a pontic structure for permanent attachment in the mouth and presenting a cusp opposite a tooth gap with an occlusal surface formed on said cusp, the gingival surface of said cusp having an inclined labio-occlusally from the lingual side, a porcelain tooth-body having a facing and an integral root extension adapted to be received within the socket left by extraction of the natural tooth prior to absorption of the bony process, said root extension having an inclined occlusal surface adapted to fit said inclined gingival surface of said cusp, and interlocking elements on the said cusp and said body whereby said body may be slid into engagement with said cusp in the direction of said inclined surfaces and thereby into said socket.

9. An artificial tooth which includes a root extension and a crown portion, the tooth body being provided with an inclined surface extending labio-occlusally from the lingual face, and a mortise extending through the lingual face of the tooth, the labial face of the tooth extending a greater distance than the lingual face from the gingival end, and a cusp plate having a surface to fit said inclined surface, and tenon to cooperate with the mortise.

10. A divisible tooth including a tooth body and a cusp plate, the tooth body being formed with an integral root extension, a backing seat formed on said tooth body, said seat being disposed so as to be out of contact with the gum, a bore in the tooth body extending from the lingual face toward the labial face, a slot of less diameter opening said bore for a part of its length to the surface of said seat, the remaining portion of the bore being closed to said seat, said cusp plate having a post connected to it by a plate of less diameter than the post whereby the post and plate are adapted to slide and fit in said bore and slot and thereby connect the cusp plate to the tooth body, the labial end portion of the post extending beyond the labial end of the slot.

In testimony whereof I affix my signature.

ARTHUR S. LEVY.

CERTIFICATE OF CORRECTION.

Patent No. 1,905,595.　　　　　　　　　　　　　　April 25, 1933.

ARTHUR S. LEVY.

It is hereby certified that error appears in the printed specification of the above numbered patent requiring correction as follows: Page 4, line 8, claim 8, for the word "inclined" read incline; and that the said Letters Patent should be read with this correction therein that the same may conform to the record of the case in the Patent Office.

Signed and sealed this 8th day of February, A. D. 1938.

Henry Van Arsdale,
Acting Commissioner of Patents.

(Seal)